March 17, 1970  R. A. HEINZEN ET AL  3,501,661
SPOOL CONSTRUCTION FOR THE STATOR COIL OF
A SYNCHRONOUS A.C. MOTOR
Filed Jan. 7, 1969

INVENTOR.
ROBERT A. HEINZEN
LOYD H. HASLEE
BY Charles J. Worth

AGENT

United States Patent Office 3,501,661
Patented Mar. 17, 1970

3,501,661
SPOOL CONSTRUCTION FOR THE STATOR COIL OF A SYNCHRONOUS A.C. MOTOR
Robert A. Heinzen, Manitowoc, and Loyd H. Haslee, Plymouth, Wis., assignors to American Machine & Foundry Company, a corporation of New Jersey
Filed Jan. 7, 1969, Ser. No. 789,518
Int. Cl. H02k 3/00, 7/118
U.S. Cl. 310—194        8 Claims

ABSTRACT OF THE DISCLOSURE

Directionally controlled synchronous motor toroidal stator coil spool construction provided with a cylindrical crown extending axially beyond one of the annular flanges with the inner surface thereof provided with spaced lugs or abutments to be engaged by a rotor directional control member. Recesses are provided for the salient poles of one or more claw tooth stator pole pieces. In a modification a cuplike cover is provided on the crown.

---

This invention relates generally to synchronous A.C. motors having directional control devices and more particularly to stator means providing annular series of stop surfaces adapted to be engaged by stop means for preventing the rotor of such motor from turning an undesired direction.

In synchronous A.C. motors of the types embodied in clocks and time switch controls and the like when first energized normally the rotors thereof are capable of starting to rotate either clockwise or counterclockwise depending in each instance upon the polarity of the first half cycle of the energizing A.C. current and the position of the rotor. To prevent the rotors of such motors from rotating opposite to the direction desired, many arrangements have been proposed and used with limited success and acceptance.

An object of the present invention is to provide an improved stator spool construction providing fixed stops adapted to be engaged by directional control means of a synchronous A.C. motor.

Another object of the present invention is to provide an improved spool for the stator coil and direction control of a synchronous A.C. motor.

And another object of the present invention is to provide the foregoing spool having a crown portion providing fixed stop means adapted for engagement by directional control means to limit the rotor of the motor to rotation in only one predetermined direction.

The present invention contemplates a spool for a synchronous A.C. motor with directional control means, comprising a tubular body portion, a pair of annular flanges each extending outwardly from a different end of the body portion, a tubular crown portion axially aligned with the body portion outwardly of one of the flanges, the inner surface of the crown portion being formed to provide an annular series of spaced lug portions and a plurality of thin wall portions each disposed between a different two adjacent lug portions of the series, and each of the lug portions extending inwardly from the adjacent thin wall portions thereby providing a pair of stop surfaces each adapted to be engaged by directional control means when extended to prevent the rotor of the motor from rotating in an undesired direction.

The foregoing and other objects and advantages will appear more fully hereinafter from a consideration of the detailed description which follows, taken together with the accompanying drawing wherein several embodiments of the invention are illustrated by way of example. It is to be expressly understood, however, that the drawing is for illustration purposes only and is not to be construed as defining the limits of the invention.

Figure 1:
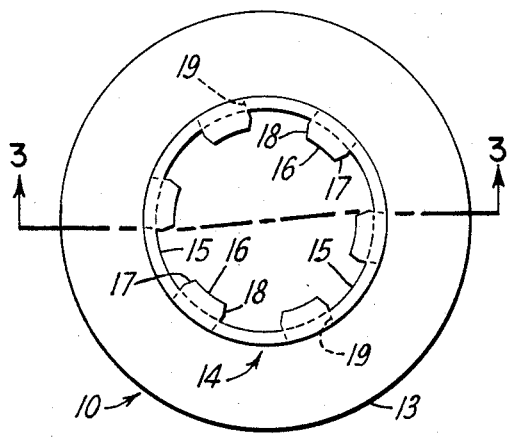
FIGURES 1 and 2 are plan and elevational views, respectively, of one form of spool construction in accordance with the present invention.
Figure 2:
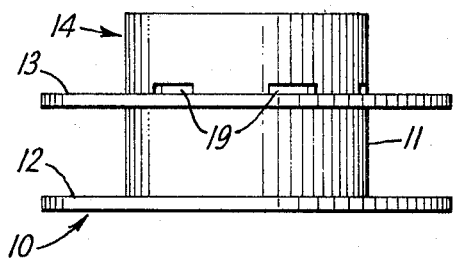
Figure 3:
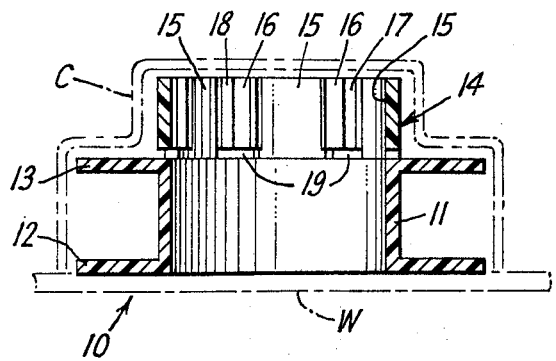
FIGURE 3 is a sectional view taken on line 3—3 of FIGURE 1.

Referring now to the drawings and particularly to FIGURES 1 to 3, the novel spool or spool means 10 of dielectric material is made as a unitary structure for embodiment in a motor having a single pole piece as shown in U.S. Patent 3,164,734 granted Jan. 5, 1965 to R. A. Heinzen and assigned to the same assignee. To accommodate a second pole piece, the crown portion 14 would be fixedly joined to the rest of the spool after the second pole piece is in place.

Considering first the environment of a motor having a single pole piece, the spool means 10 is provided with a tubular body portion 11 and a pair of annular flanges 12 and 13 each extending outwardly from a different end of the body portion thereby defining an annular chamber for a stator coil winding (not shown). The tubular crown portion 14 is axially aligned with the body portion 11 and is disposed on the other side therefrom or outwardly of one of the annular flanges which, in this instance, is the flange 13.

The inner surface of the crown portion 14 is formed to provide an annular series of spaced lugs, abutments or protrusions 16 connected serially to one another by thin wall portions 15. The lugs or protrusions 16 each provide a pair of stop surfaces 17 and 18 each adapted to be engaged by a directional control means (not shown) when in the extended position in one of the recesses provided by the thin wall portions 15 between two adjacent lugs.

As shown in FIGURE 3, the novel spool 10 is fixedly retained in position in the motor case with the flange portion 12 adjacent a wall portion W of the motor case and preferably enclosed in a cover C. The single pole piece (not shown) would be disposed adjacent the wall W with the salient poles thereof extending axially along the inner surface of the body portion 11 toward the crown portion 14, as disclosed in the aforementioned Patent 3,164,734.

If the motor utilizes two pole pieces, the second pole piece is positioned on the outer side of the flange 13 with the salient poles thereof extending axially within the tubular body portion 11 toward the end thereof with the flange 12. One end of the crown portion 14 is provided with a series of notches or recesses 19 for the salient poles of the second pole piece, and is then fixedly joined or connected to the end of the body portion 11 with the flange 13 by any suitable means known in the art. As shown in FIGURE 3, the notches or recesses 19 form slots for the salient poles of the second pole piece when the spool is completed and are located, in this instance, in line with the lugs, abutments or protrusions 16. When the spool 10 is assembled into the motor, the second pole piece (not shown) would be disposed between the flange 13 and the cover C encircling the notched end of the crown portion 14.

Figure 4:
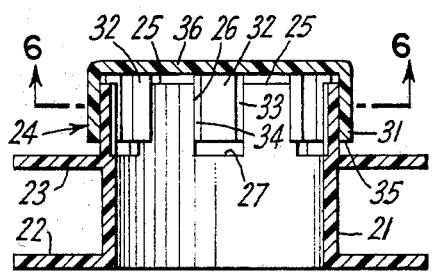
FIGURE 4 is a view similar to FIGURE 3 of another or a modified form of spool construction.
Figure 5:
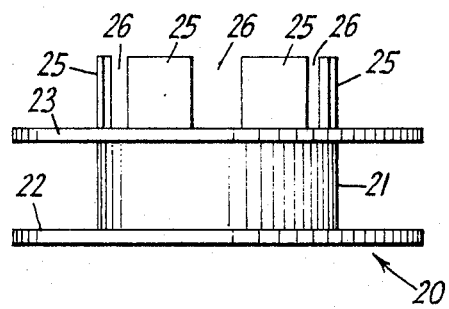
FIGURE 5 is an elevational view of the spool means of FIGURE 4 with the cap portion removed.
Figure 6:
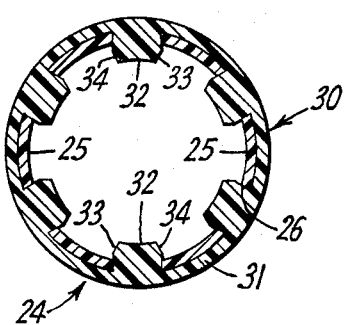
FIGURE 6 is a sectional view taken on line 6—6 of FIGURE 4.

A modified spool or spool means 20, as shown in FIGURES 4 to 6, may be embodied in a motor having either one or two pole pieces. The spool means 20 is provided with a tubular body portion 21 and a pair of annular end flanges 22 and 23 corresponding to the body portion 11 and flanges 12 and 13, respectively, of spool means 10. The crown portion 24 is now provided by a cap member or portion 30 which is removably applied at one end of the spool means 20 and an annular series of thin wall portions 25 extending axially from the body portion 21 outwardly of the flanges 23. The thin wall portions 25 are angularly spaced from one another by intervening slots or recesses 26 having end walls 27 which preferably are substantially coplanar with the outer surface of the flange 23.

The cap portion or member 30 is similar in structure to the crown portion 14 of the spool means 10 in that it has an annular wall 31 with an inner surface formed to provide a series of spaced lugs, abutments or protrusions 32. When the spool means 20 is assembled the lugs, abutments or protrusions 32, corresponding to the lugs, abutments or protrusions 16, extend through the openings or slots 26 between the spaced thin wall portions 25 and provide stop surfaces 33 and 34, corresponding to surfaces 17 and 18.

The open end 35 of the cap or cover member 20 may be spaced from the flange 23 to form with the end walls 27 a series of slots corresponding to the slots 19 for the salient poles of a second pole piece (not shown). The cap 30 may be a ring-like member or may be provided with a wall 36, as shown, to close the formed crown portion 24 of the spool means 24.

Although several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A spool construction for the stator coil of a synchronous A.C. motor having a rotor means with a control member extensible transverse to its axis of rotation to engage a fixed abutment to limit rotation of the rotor to one predetermined direction, comprising
   a tubular body portion adapted to encircle the rotor means of a motor,
   a pair of annular flange portions each extending outwardly from a different end of the body portion and defining an annular coil winding chamber therebetween, and
   a tubular crown portion disposed on the side of one of said flange portions opposite from and in axial alignment with said body portion,
   said crown portion being adapted to encircle a directional control member of the rotor means and having an inner surface formed to provide an annular series of spaced inwardly extending abutments each adapted for engagement by the encircled control member when extended and depending upon its angular position relative to said crown portion.

2. The spool construction in accordance with claim 1, and
   said body, flange and crown portions all being integral.

3. The spool construction in accordance with claim 1, and
   said body and flange portions being integral, and one end of said crown portion being permanently connected to the end of said body portion from which said one flange portion extends.

4. The spool construction in accordance with claim 3, and
   said one end of said crown portion having a plurality of recesses therein in equally spaced series providing passages for an annular series of spaced salient poles of a pole piece positioned adjacent said one flange portion, and
   said crown portion being permanently connected only after such a pole piece is in place.

5. The spool construction in accordance with claim 1, and said crown portion comprising
   an annular series of equally spaced wall portions extending from said end of said body portion, and
   an annular wall portion encircling said annular series of wall portions and having a plurality of spaced inwardly extending abutments each through a different space between two of said wall portions and terminating inwardly thereof.

6. The spool construction in accordance with claim 5, and
   said body, flange and annular series of wall portions being integral,
   said annular wall portion and said abutments being integral, and
   each of said abutments extending axially substantially the full length of the space through which it extends and being engaged and retained against rotation by wall portions of said annular series adjacent thereto.

7. The spool construction in accordance with claim 6, and
   one end of said annular wall and said abutments adjacent said end of said body portion being spaced therefrom and with the spaces between said wall portions of said annular series providing a plurality of slots for the salient poles of a pole piece to be provided adjacent said one flange portion.

8. The spool construction in accordance with claim 6, and
   a cover member providing said annular wall portion and abutments, and
   said cover member being open at one end adjacent said end of said body portion and having a wall at its other end closing the end of the space within the tubular body and crown portions.

References Cited

UNITED STATES PATENTS

| | | | |
|---|---|---|---|
| 2,722,615 | 11/1955 | Morganson | 310—41 |
| 3,129,348 | 4/1964 | Simmons | 310—194 |
| 3,308,315 | 3/1967 | Mahon et al. | 310—41 |
| 3,448,308 | 6/1969 | Pervorse et al. | 310—41 |

WARREN E. RAY, Primary Examiner

U.S. Cl. X.R.,

310—41